C. MILLER.
ROTARY STEAM ENGINE.
APPLICATION FILED DEC. 21, 1907.
931,785.
Patented Aug. 24, 1909.
2 SHEETS—SHEET 1.
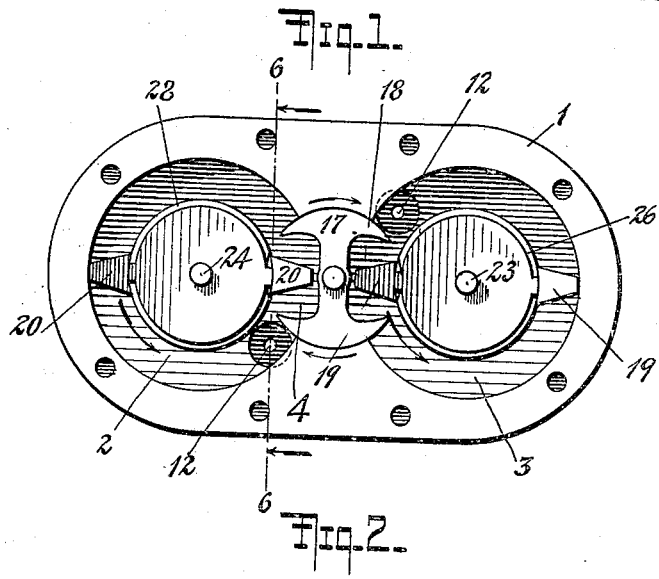
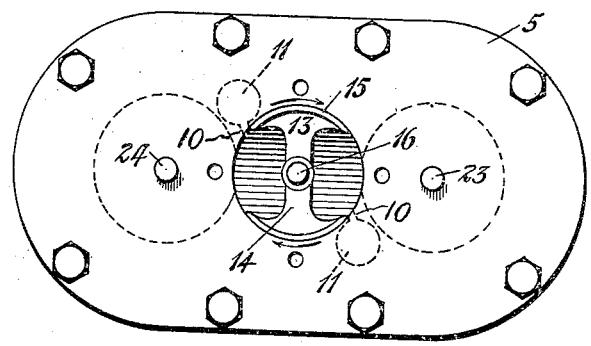
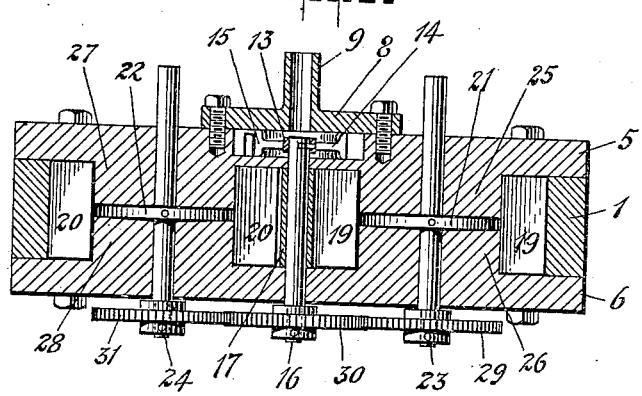
Witnesses:
Inventor
CHARLES MILLER
By his Attorneys C. MILLER.
ROTARY STEAM ENGINE.
APPLICATION FILED DEC. 21, 1907.
931,785.
Patented Aug. 24, 1909.
2 SHEETS—SHEET 2.
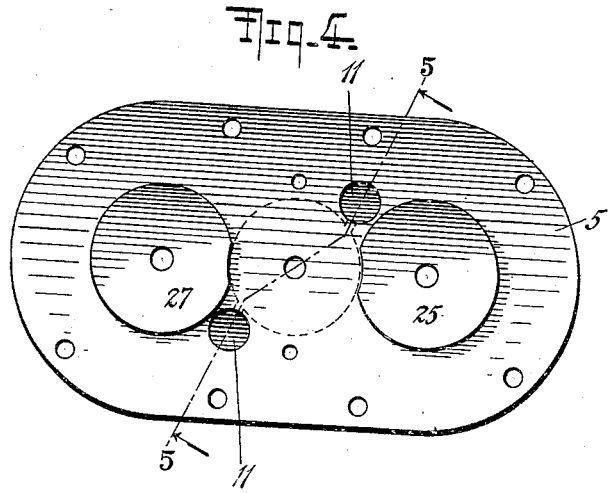
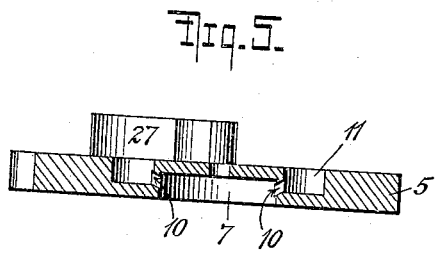
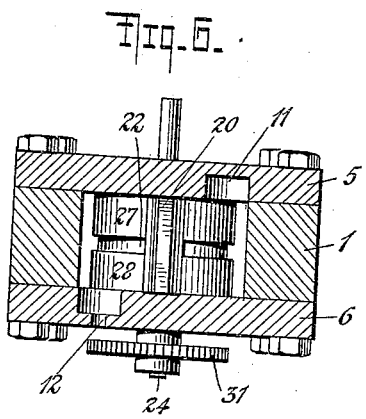
Witnesses:
Inventor
CHARLES MILLER
By his Attorneys

UNITED STATES PATENT OFFICE.

CHARLES MILLER, OF NEW YORK, N. Y.

ROTARY STEAM-ENGINE.

931,785.  Specification of Letters Patent.  Patented Aug. 24, 1909.

Application filed December 21, 1907. Serial No. 407,469.

*To all whom it may concern:*

Be it known that I, CHARLES MILLER, a citizen of the United States, residing in the city, county, and State of New York, have invented a new and useful Improvement in Rotary Steam-Engines, of which the following is a specification.

The invention, of which my rotary engine is an embodiment, is designed with the idea of taking advantage of the many desirable features of this type of engine such as lack of reciprocating parts, absence of dead center, simplicity of arrangement, compactness, etc., while at the same time avoiding as far as possible its disadvantages.

My invention is directed especially to the construction of a rotary engine in which the friction of the various moving parts is reduced to an unusual degree. This is a very important factor in rotary engines as owing to the high speeds under which it has hitherto been necessary to operate, the amount of friction has been so very great as to be the cause of a very considerable loss of power.

My object is to increase as far as possible the size of the expansion chambers, thus removing the necessity of operating under excessive speeds.

A further object has been to reduce the pressures on the various sliding parts so as to obviate the excessive friction that is ordinarily incident to the movement of machine parts at high speeds. This, I have accomplished in one instance by balancing one of the rotating elements in such a way that whenever a certain thrust due to the steam pressure is exerted on one side an equal and opposite thrust is always provided on the opposite side. I have also arranged the journals of the remaining rotating elements so as to remove them as far as possible from the influence of the steam pressure, so that although these parts are not so arranged that the steam pressure balances them from opposite sides, nevertheless, the thrust due to the steam pressure thereon is reduced to a minimum, and the parts are allowed to rotate substantially as if they were not subjected to any force other than that of their own weight. The various remaining details of my structure are such, furthermore, as have been found to be conducive to the production of a maximum of efficiency in the normal operation of the engine.

In the accompanying drawings: Figure 1 represents a vertical view of my engine with one side plate removed; Fig. 2 is a vertical elevation of the engine with the cover for the valve-chamber removed; Fig. 3 is a horizontal view of the entire engine in section; Fig. 4, an inside elevational view of the side-plate appearing in Fig. 2; Fig. 5, a sectional view of the same plate taken on line 5—5, Fig. 4; and Fig. 6, a sectional view of the same taken on line 6—6, Fig. 1.

The engine consists of a main casing 1, having two circular transverse openings 2, 3, to constitute steam expansion chambers and an additional smaller circular central opening 4 intersecting the peripheries of the steam chamber openings, all of said openings being closed by side-plates 5, 6, secured to the main casing 1 in any approved manner as by screws or bolts.

In the outer face of the side-plate 5 is located a valve-chamber 7 which is closed by a head 8, secured thereto by screws or bolts, having a steam inlet pipe 9 projecting laterally from its center. Located in the sides of the valve chamber are two longitudinal steam ports 10, both of which connect with transverse steam ports 11 and thence with the steam chambers 2, 3. It will be noted that these steam ports are diagonally opposite each other. In the side-plate 6 and on the other diagonal are located two exhaust ports 12, one for each of the steam chambers.

A rotary valve 13 is situated in the valve chamber 7. This valve consists of a transverse septum 14 the ends of which are provided with cylindrically shaped members 15 which are wider and thicker than the septum 14 and adapted to fit closely within the circular valve chamber 7. The septum 14 is tight on a central shaft 16, which extends entirely through the main casing 1 and the side plates 5, 6, being journaled in the latter. On this shaft within the chamber 4 is secured a rotary abutment 17 having two opposite cavities 18. The pistons or wings 19, 20 fit within these cavities though not necessarily tightly as the valve 13 operates in such a way as to prevent the escape of steam when the pistons are at this point in the path of their rotation. The pistons 19, 20 fit closely within the expansion chambers 2 and 3 where they rotate with the thin cores 21, 22 carried upon the axles 23, 24, journaled in the side plates 5, 6. The thin cores 21, 22 are each supported between two of the cylindrical bosses 25, 26, 27, 28 which project from the surfaces of the side plates 5, 6 around the axles 23, 24 into the expansion chambers 23. It will be noted that the thickness of each core is only a very small proportion of the entire width of the steam chamber in which it is contained, but that almost the entire width of the chamber is occupied by the cylindrical bosses. The axles 23, 24 and the shaft 16 project through the side plate 6 and are provided with gear wheels 29, 30, 31, which mesh with each other. These gear wheels are all of the same size. One of the shafts 23, 24 may be extended to any length desired and furnished with a power-pulley (not shown).

In the operation of the device, steam being admitted to pipe 9, it passes thence into the valve chamber 7, the septum 14 being sufficiently thin to allow the free passage of the steam both above and below it. When the rotary valve has uncovered the ports 10 the steam passes simultaneously through these to the two steam expansion chambers 2 and 3. The valve 13, however, is so placed on the shaft 16 that these ports are uncovered only when the periphery of the abutment 17 is in contact with the cores 21, 22, so that when the abutment is in the position shown in Fig. 1, for example, the steam supply is shut off, as in my engine I make the pistons or wings 19, 20 fit only loosely in the cavities 18, thereby avoiding the very great amount of friction that invariably accompanies a tight fit between these parts. The valve 13 is furthermore so arranged on the shaft 16 that the steam is not permitted to enter the steam chambers until the pistons or wings 19, 20 have passed beyond the steam inlets 10 as, otherwise, the admission of steam at this point in the rotation of the pistons would have a tendency to retard rather than accelerate their movement. The steam, then, after passing into the steam chambers continues to expand thereby driving the pistons around their axes in the direction of the arrows, until they pass beyond the exhaust ports 12, at which point the steam is, of course, allowed to exhaust. As there are two pistons or wings in each steam chamber it should be noted that while steam is being admitted to one part of each of the chambers steam is being exhausted from another portion thereof. Through the agency of the gears 29, 30 and 31 the pistons in the two steam chambers rotate in unison and at the same speed. There is consequently only a rolling contact between the rotary abutment and the axes as all these have the same diameter. Power is conveyed from the shaft 23 or the shaft 24 and utilized for any purpose desired.

Viewed as a whole, it will be seen that a very large proportion of the space taken up by my engine comprises expansive space for the steam. This, as intimated above, is a very important feature in this type of engine as by providing a large space for expansion the speed at which it is necessary to operate this type of engine to obtain the proper return of power may be decreased to that extent thereby decreasing the amount of friction and securing a consequent increase of efficiency in the production of power.

By arranging the abutment in the middle and admitting the steam to the two chambers simultaneously on diametrically opposite sides thereof, and closing off the steam in the two chambers simultaneously, the forces or side thrusts exerted on the two sides of the abutment are always maintained equal and opposite. As a consequence, the friction and wear on the journals of the abutment and between the abutment itself and its casing are reduced to a minimum.

The thickness of the cores 21, 22 has been made very slight so as to reduce the side thrust of the steam on the axles 23 and 24 to an almost negligible quantity so far as friction and tendency to wear are concerned.

As has been noted above I have especially constructed my engine with a very loose fit between the rotary abutment and the pistons so as to avoid friction at this point.

Various changes might be made in the minor details and in the substitution of equivalents for the important features without departing from the spirit of my invention.

What I claim and wish to secure by Letters Patent is:

1. In a device of the character described and having a rotary abutment located between opposite steam chambers, a rotary piston in each steam chamber said piston comprising opposite wings fixed to a thin core and the axis of rotation of said piston being perpendicular to said core, substantially as and for the purpose described.

2. In a device of the character described and having a rotary abutment located between opposite steam chambers, a rotary piston in each steam chamber said piston comprising opposite wings fixed to a thin core, the axis of rotation of said piston being perpendicular to said core and said core being adapted to rotate with its edge rolling upon the heads of said abutment, substantially as and for the purpose described.

3. In a device of the character described and having a rotary abutment located between opposite steam chambers, a rotary piston in each steam chamber said piston comprising wedge shaped wings oppositely placed and fixed to a thin core and the axis of rotation of said piston being perpendicular to said core, substantially as and for the purpose described.

4. In a rotary engine comprising a central abutment rotating between opposite steam chambers, a valve adapted to control the steam supply, said valve being attached to the abutment and rotating therewith in a cylindrical valve chamber with which said valve contacts only at the cylindrical wall thereof whereby steam surrounds said valve except at its ends and valve friction is diminished, substantially as and for the purpose described.

5. In a rotary engine comprising a central abutment rotating between opposite steam chambers, a valve adapted to control the steam supply, said valve comprising a thin septum fixed transversely to the abutment axis and inclosed in a valve chamber with free space on all sides of said septum except at the ends thereof which are formed as segments of a cylinder and closely engage cylindrical walls of the valve chamber, said walls being provided with opposite ports which are adapted to be cyclically opened and closed as the valve rotates, substantially as and for the purpose described.

6. A rotary engine comprising a casing inclosing opposite annular steam chambers, a central steam chamber in which is a two-lobed rotary abutment, a piston in each annular steam chamber, comprising two opposite wings fixed to a thin core, said wings being adapted to coöperate with said abutment and the lobes of said abutment being adapted to roll upon the edges of said cores, and a valve upon the abutment shaft, said valve being adapted to control the steam supply and moving within a cylindrical valve chamber with which said valve contacts only at the cylindrical wall thereof, substantially as and for the purpose described.

In testimony whereof, I have hereunto affixed my name in the presence of two subscribing witnesses.

CHARLES MILLER.

Witnesses:
ARTHUR WRIGHT,
JOHN A. KEHLENBECK.